(12) United States Patent
Chen et al.

(10) Patent No.: US 7,653,120 B2
(45) Date of Patent: Jan. 26, 2010

(54) CHANNEL-ADAPTIVE WAVEFORM MODULATION

(75) Inventors: Aiyou Chen, New Providence, NJ (US); Thomas Louis Marzetta, Summit, NJ (US); Jack Salz, Fair Haven, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 700 days.

(21) Appl. No.: 11/347,589

(22) Filed: Feb. 4, 2006

(65) Prior Publication Data

US 2007/0183480 A1    Aug. 9, 2007

(51) Int. Cl.
*H04B 1/00* (2006.01)

(52) U.S. Cl. .................. 375/141; 375/146; 375/147; 375/219; 375/221; 375/295; 375/296; 375/316; 375/346; 375/348

(58) Field of Classification Search .......... 375/141, 375/146, 147, 219, 221, 295, 296, 316, 346, 375/348
See application file for complete search history.

(56) References Cited

U.S. PATENT DOCUMENTS

| | | | | |
|---|---|---|---|---|
| 5,465,396 A | * | 11/1995 | Hunsinger et al. | 455/61 |
| 5,956,373 A | * | 9/1999 | Goldston et al. | 375/298 |
| 6,510,175 B1 | * | 1/2003 | Hunsinger et al. | 375/216 |
| 6,563,880 B1 | * | 5/2003 | Hunsinger et al. | 375/260 |
| 7,327,795 B2 | * | 2/2008 | Oprea | 375/260 |
| 2003/0031264 A1 | * | 2/2003 | Barry et al. | 375/259 |
| 2005/0147183 A1 | * | 7/2005 | Willink | 375/299 |
| 2005/0185732 A1 | * | 8/2005 | Mandyam | 375/285 |
| 2006/0019694 A1 | * | 1/2006 | Sutivong et al. | 455/522 |
| 2008/0317141 A1 | * | 12/2008 | Burg et al. | 375/260 |

* cited by examiner

*Primary Examiner*—Chieh M Fan
*Assistant Examiner*—Siu M Lee
(74) *Attorney, Agent, or Firm*—John F. McCabe

(57) ABSTRACT

A method for transmitting a sequence of data blocks of equal length includes obtaining part of a matrix for the impulse response function of a communication channel between a transmitter and a receiver. The part relating to channel-induced interference between sampling intervals of adjacent ones of the data blocks. The method includes designing a set of one or more linearly independent waveforms based on the obtained part of the matrix for the impulse response function and transmitting a sequence of the data blocks over the channel from the transmitter to the receiver. Each data block of the sequence is a weighted linear superposition of the one or more waveforms of the designed set.

16 Claims, 8 Drawing Sheets

CHANNEL-ADAPTIVE WAVEFORM MODULATION

BACKGROUND

1. Field of the Invention

The invention relates generally to data communications and, more particularly, to reducing inter-symbol interference in data communications.

2. Discussion of the Related Art

This section is intended to introduce aspects that may be helpful to facilitating a better understanding of aspects of the invention. Accordingly, statements of this section are to be read in this light and are not to be understood as admissions about the scope of the prior art.

Data communication schemes have handled inter-symbol interference (ISI) by a variety of techniques. One such technique is known as orthogonal frequency division multiplexing (OFDM). OFDM uses modulation waveforms that enable the essential removal of ISI in a frequency-dependent channel.

In OFDM, each transmitted data block is a weighted superposition of OFDM modulation waveforms. The OFDM modulation waveforms form an orthonormal basis set over a time period ($T_S$-$T_g$) where $T_S$ is the length of the OFDM block and $T_g$ is the duration of either a guard interval or a cyclic prefix. The communication channel has a delay spread $T_D$ that is the length of a communication channel's memory. Since ISI does not distort symbols separated by the communication channel's delay-spread, $T_g$ is selected to be greater than or equal to $T_D$ in OFDM. In an OFDM block, the weights of the superposition define the data symbol being transmitted.

In OFDM, each transmitted data block is demodulated by projecting the received data block onto a basis set of conjugate OFDM modulation waveforms. Since the OFDM modulation waveforms are a basis set over the interval ($T_S$-$T_g$), the projections may be performed over the last ($T_S$-$T_g$) of the OFDM data blocks. That is, the projections do not need to use prefix portions of the OFDM data blocks. Since the channel memory is limited to a time of length $T_D$, an earlier transmitted OFDM block substantially only produces ISI in the cyclic prefix or guard portion of the next received OFDM data block. Thus, by ignoring said cyclic prefix or guard portions of received OFDM data blocks, OFDM produces demodulated data that is substantially free of distortion due to ISI. OFDM techniques may also effectively diagonalize the communication channel.

Unfortunately, cyclic prefix and guard portions of OFDM data blocks consume bandwidth that might otherwise be used to transmit data. As the communication channel's delay-spread approaches the temporal length of the OFDM data block, the bandwidth remaining for carrying data shrinks to zero. Thus, OFDM communication schemes would not be expected to be bandwidth-efficient in communication channels whose delay-spreads approach the length of the OFDM data blocks.

SUMMARY

Certain aspects commensurate in scope with the disclosed embodiments are set forth below. It should be understood that these aspects are presented merely to provide the reader with a brief summary of certain aspects the invention might take and that these aspects are not intended to limit the scope of the invention. Indeed, the invention may encompass a variety of aspects that may not be set forth below.

Various embodiments enable transmitting data blocks in ways that effectively remove ISI. Some of the embodiments may be more bandwidth-efficient than OFDM. In particular, some of the embodiments can provide substantial data throughput even if the communication channel has a delay-spread close to the length of the data blocks being transmitted.

In one aspect, an embodiment features a method for transmitting a sequence of data blocks of equal length. The method includes obtaining part of a matrix for the impulse response function of a communication channel between a transmitter and a receiver. The part relates to channel-induced interference between sampling intervals of adjacent ones of the data blocks. The method includes designing a set of one or more linearly independent waveforms based on the obtained part of the matrix for the impulse response function. The method includes transmitting a sequence of the data blocks over the channel from the transmitter to the receiver. Each data block of the sequence is a weighted linear superposition of the one or more waveforms of the designed set.

In another aspect, an embodiment features a method for receiving at a receiver data transmitted from a transmitter via a communication channel having a delay-spread. The method includes receiving a sequence of transmitted data blocks at the receiver via the communication channel. Each transmitted data block has the same temporal length and is transmitted to the channel from the transmitter. For each of the received data blocks, the method includes evaluating an inner product between the received data block and one or more linearly independent conjugate waveforms by sampling a product of the conjugate waveform times the received data block at a series of sampling intervals of equal sampling length. The evaluating is performed over a number of the conjugate waveforms that is greater than the number of the sampling intervals minus the delay-spread. The delay-spread is expressed as a number of the sampling intervals.

In one aspect, an embodiment features an apparatus for communicating data. The apparatus includes a transmitter including an array of modulators and an adder. Each modulator is configured to modulate an amplitude of a corresponding waveform over a sequence of sampling intervals in response to receipt of each of a sequence of input data symbols. The adder is configured to form a sequence of data blocks. Each data block is a linear superposition of the modulated transmitter waveforms produced by the modulators responsive to receipt of one of the input data symbols. The adder is configured to transmit the data blocks to a receiver via a communication channel. The transmitter is configured to dynamically adapt the waveforms in a manner responsive to a part of the channel's impulse response function that relates to channel-induced interference between sampling intervals of adjacent data blocks.

BRIEF DESCRIPTION OF THE DRAWINGS

Various embodiments are described more fully by the Figures and Detailed Description of Illustrative Embodiments. Nevertheless, the inventions may be embodied in various forms and are not limited to embodiments described in the Figures and/or Detailed Description of Illustrative Embodiments.

FIG. 4b is a flow chart illustrating the communication phase of the communication method of FIG. 4a;

FIG. 7 is a flow chart illustrating a method of designing CAWs and CACWs, wherein the method and/or waveforms may be used in methods of FIGS. 3a, 3b, and 4a;

In the Figures and text, like reference numerals indicate elements with similar functions.

DETAILED DESCRIPTION OF ILLUSTRATIVE EMBODIMENTS

Various embodiments provide channel-adaptive waveform modulation schemes for communication channels that exhibit a delay-spread. In these schemes, each transmitted data block is a weighted superposition of temporally aligned waveforms. In the superpositions, the weights carry the data symbols being transmitted, e.g., QAM symbols. In contrast to OFDM, the channel-adaptive waveforms are closely adapted to the impulse response of the communication channel. This adaptation enables some embodiments of channel-adaptive waveform modulation to realize superior throughput than OFDM. In some embodiments, the adaptive nature of the waveforms is also dynamic so that the waveforms are updated in a manner that compensates changes in the impulse response of the communication channel.

Below, parts of the description will use a complex baseband description of the channel and signals as discrete time variables. In this description, the various signals and channel quantities are described as complex baseband functions whose values depend on the sampling interval. A sampling interval refers to the temporal interval over which a modulator or demodulator applies one data value to the signal being modulated or demodulated. The embodiments and claims are meant to cover situations where frequency up-conversion occurs in the transmitter and frequency down-conversion occurs in the receiver as well as situations where no such conversions occur.

Figure 1:
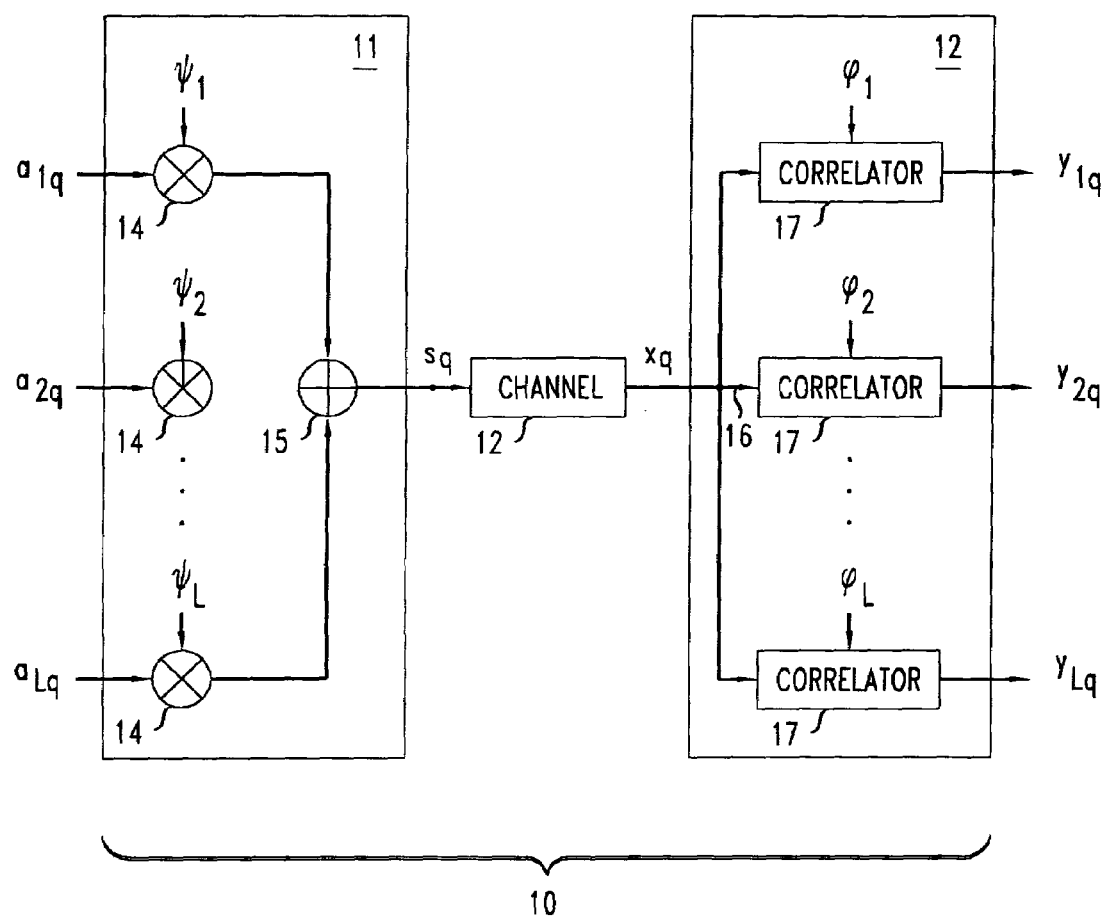
FIG. 1 is a block diagram illustrating an exemplary embodiment of a communication system.

FIG. 1 illustrates an exemplary embodiment of a communication system 10. The communication system 10 includes a transmitter 11, a receiver 12, and a frequency-dependent communication channel 13. The transmitter 11 includes a parallel array of L modulators 14, and an adder 15. In the array, each individual modulator 14 is configured to amplitude modulate a received component of an input data symbol onto a waveform, wherein each waveform is in correspondence one of the modulators 14. For example, the k-th modulator 14 modulates its waveform with the $a_{kq}$ component of q-th input data symbol $[a_{1q} a_{2q}, \ldots, a_{Lq}]$ in response to the receipt of the q-th input data symbol in the transmitter 11. In the array, each modulator 14 modulates the input data symbol onto its waveform in parallel with the other modulators 14 of the array. Thus, the array formed by the modulators 14 will produce a temporally synchronized array of L modulated waveforms in response to the receipt of an input data symbol. The adder 15 is connected to sum the amplitude modulated waveforms of the array in a temporally aligned manner to produce a temporal sequence of output signals, i.e., $\ldots S_{t-1}$, $S_t, S_{t+1} \ldots$, for transmission to the communication channel 13. Each of the output signals is a superposition of waveforms modulated at the same sampling interval.

The communication channel 13 transports the signals from the transmitter 11 to the receiver 12. In different embodiments, the communication channel 13 may be a wireless channel, an optical fiber channel, or a wire line channel and may be operated in simplex or duplex mode. The transport over the communication channel 13 transforms each transmitted signal into a corresponding signal at the receiver 12, e.g., $s_t \to x_t$ for the signals corresponding to the sampling interval "t". The transport over the communication channel 13 effectively convolves output signal, $s_t$, by the communication channel's impulse response, $h_T$, and adds a noise, $w_t$, so that the corresponding signal $x_t$ received at the receiver 12 for the sampling interval "t" is given by:

$$x_t = \sum_{T=0}^{T_p} h_T s_{t-T} + w_t. \quad (1)$$

In eq. (1), the integer $T_D$ is the delay-spread of the communication channel. The delay-spread determines the number of sampling intervals over which an earlier modulated and transmitted signal can produce interference in the received signal corresponding to a later modulated and transmitted signal.

The receiver 12 includes an input 16 and a parallel array of L demodulators 17, i.e., the number demodulators 17 is typically equal to the number of modulators 14. The input port 16 also transmits the sequence of received signals, i.e., $\ldots x_{t-1}$, $x_t, x_{t+1} \ldots$, to the demodulators 17 of the array in parallel. Each demodulator 17 projects the received signals onto a conjugate waveform corresponding to the demodulator 17 to produce an estimate, e.g., $y_{kq}$, of a linear combination of the components of the input data symbol carried by the data block being demodulated. For example, in embodiments where the waveforms and conjugate waveforms are designed to diagonalize the channel's impulse response function, each individual $y_{kq}$ provides an estimate of the component $a_{kq}$ of the input data symbol for the same "k", i.e., up to possible scaling by a sub-channel gain. Thus, the array of demodulators 17 produce a temporally synchronized array of L estimates in response to the receiving one data block from the communication channel 13, e.g., $[y_{1q} y_{2q}, \ldots, y_{Lq}]$ in response to receiving the q-th data block $[x_{1q} x_{2q}, \ldots, x_{Lq}]$.

In the communication system 10, the waveforms and conjugate waveforms are specially adapted to the communication channel 13 so that demodulation may be performed effectively without ISI. In particular, between any one of the CACWs and any one of the CAWs, the matrix elements of the channel's impulse response function do not have a non-vanishing inter-block term. Here, the use of such special waveforms to effectively eliminate ISI involves forming each data block of superpositions of the modulated special waveforms from the same data block, i.e., without making any inter-block superpositions. This should be contrasted with other techniques for reducing ISI. For example, in ordinary equalization, signals from different blocks would typically be combined to reduce ISI. The present embodiments combine temporally aligned waveforms rather than temporally shifted signals as in equalization.

Moreover, in some embodiments, the demodulation is diagonalized with respect to the transmitted input data symbols so that the estimates of the data values are sensitive to only one transmitted input data symbol, e.g., $y_{1q}$ is only sensitive to $a_{1q}$, $y_{2q}$, is only sensitive to $a_{2q}$, etc. Then, the array of demodulators 17 is able to treat the physical communication channel as effectively being L uncoupled sub-channels. In this case, each sub-channel corresponds to one waveform/modulator 14 of the transmitter 11 and to one demodulator 17/conjugate waveform of the receiver 12. In the various embodiments, the forms of the waveforms and conjugate waveforms are specifically determined by the impulse response of the communication channel 13, i.e., the impulse response is used in the design of these waveforms.

Figure 2:
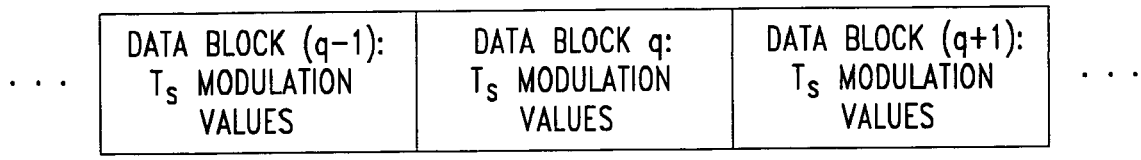
FIG. 2 illustrates a portion of the data stream in the communication channel of the communication system of FIG. 1.

Referring to FIGS. 1 and 2, the various embodiments of the communication system 10 transmit a data stream 19 over the communication channel 13 as a sequence of data blocks, e.g., consecutive data blocks (q−1), q, and (q+1). Each data block spans $T_S$ contiguous, non-overlapping sampling intervals, and the different data blocks have equal temporal length. For this reason, it will be convenient to represent the values of any signal variable over a data block as a $T_S$—dimensional vector whose individual components represent the values of the signal variable at individual sampling intervals. That is, the components of such a vector group together the values of the signal variable at the sampling intervals of one data block. For that reason, each component of such a vector will be labeled by two integer indices. The first index will represent the position of the corresponding signal variable in a data block, i.e., an integer in $[1, T_S]$, and the second integer index will represent the position of the data block in the data stream. For example, the "k q" component of such a vector will be the value of the corresponding signal variable during the k-th sampling interval of the q-th data block, i.e., at time $q \cdot T_S + k$.

Figure 3A:
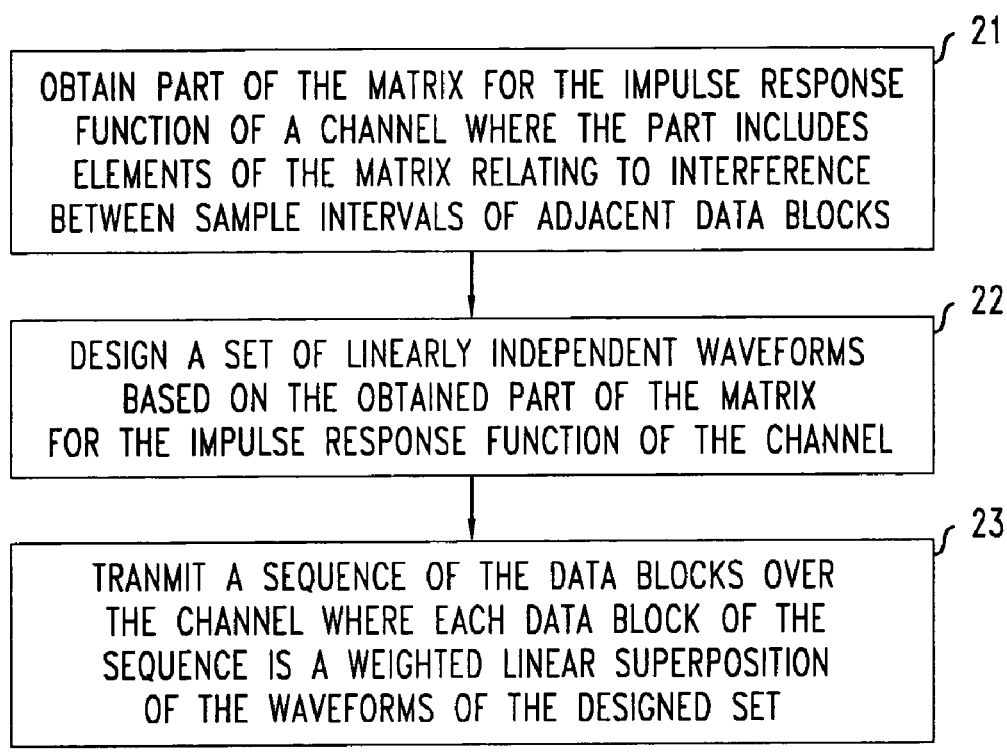
FIG. 3a illustrates a method for transmitting data from a transmitter, e.g., the transmitter of the communication system of FIG. 1.

FIG. 3a illustrates a method 20 for transmitting a sequence of data blocks of equal length in a communication system, e.g., the communication system 10 of FIG. 1. The method 25 includes obtaining part of a matrix for the impulse response function of the communication channel between a transmitter and a receiver (step 21). The part relates to channel-induced interference between the sampling intervals of adjacent ones of the data blocks. The method 20 includes designing a set of one or more linearly independent waveforms based on the obtained part of the matrix for the impulse response function (step 22). In some embodiments, the part of the matrix has vanishing matrix elements between a second set of linearly independent conjugate waveforms and the designed set of waveforms, wherein there are an equal number of the waveforms in both sets. The method 20 includes transmitting a sequence of the data blocks over the communication channel from the transmitter to the receiver (step 23). Each data block of the sequence is a weighted linear superposition of the one or more waveforms of the designed set. In some embodiments, the step of transmitting includes, for each individual data block, amplitude modulating each waveform of the designed set responsive of receipt of an input data symbol and linearly superimposing the modulated waveforms to produce the individual data block.

Figure 3B:
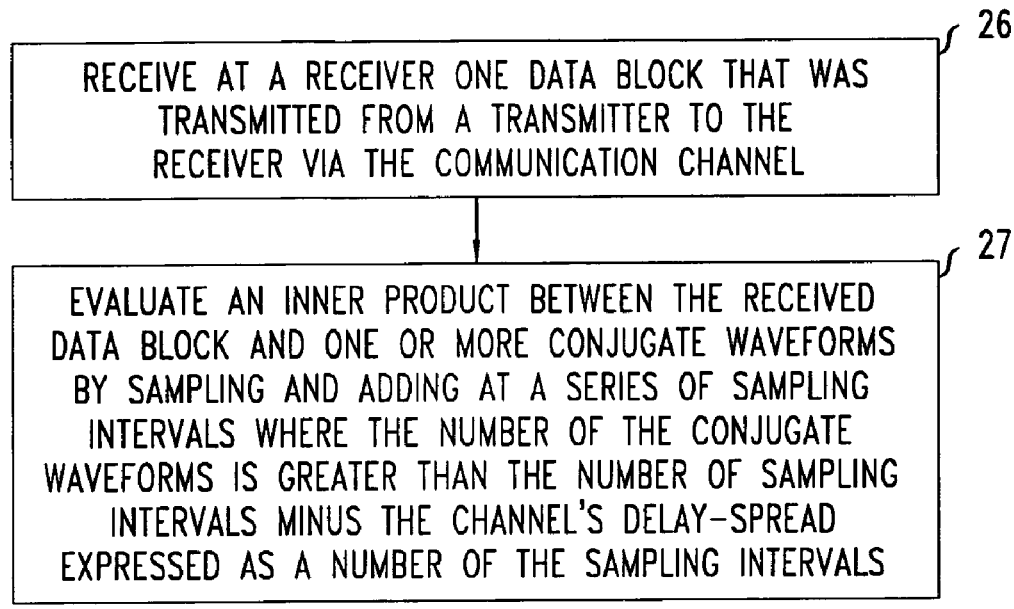
FIG. 3b illustrates a method for receiving data at a receiver, e.g., the receiver of the communication system shown in FIG. 1.

FIG. 3b illustrates a method 25 for receiving at a receiver data transmitted from a transmitter via a communication channel having a delay-spread, e.g., via the communication system 10 of FIG. 1. The method 25 includes receiving a sequence of transmitted data blocks at the receiver via the communication channel (step 26). Each transmitted data block has the same temporal length and is transmitted to the channel from the transmitter. For each of the received data blocks, the method 25 includes evaluating an inner product between the received data block and one or more linearly independent conjugate waveforms (step 27). The step of evaluating is performed by sampling a product of the conjugate waveform times the received data block at a series of sampling intervals of equal sampling length. The step of evaluating is performed over a number of the conjugate waveforms that is greater than the number of sampling intervals minus the delay-spread where the delay-spread is expressed as a number of the sampling intervals. In some embodiments, the method 25 may include designing the conjugate waveforms from a part of a matrix for the impulse response function of the communication channel, wherein the part of the matrix includes those matrix elements relating to channel-induced interference between sampling intervals of adjacent ones of the data blocks.

Specific embodiments of the method 20 of FIG. 3a and/or the method 25 of FIG. 3b may optionally include one or more additional elements and/or features of methods 30, 50,60, 80, 90 as described in FIGS. 4a, 4b, 5, 6, 7, and 8.

Figure 4A:
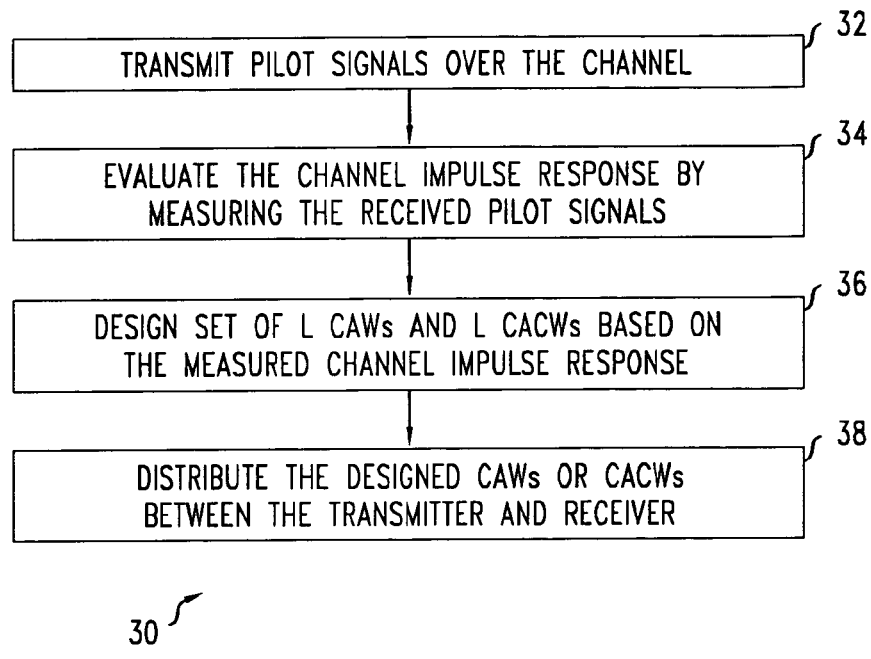
FIG. 4a is a flow chart illustrating the calibration phase of a communication method that is based on measuring a communication channel's impulse response and that may be used, e.g., by the communication system of FIG. 1.
Figure 4B:
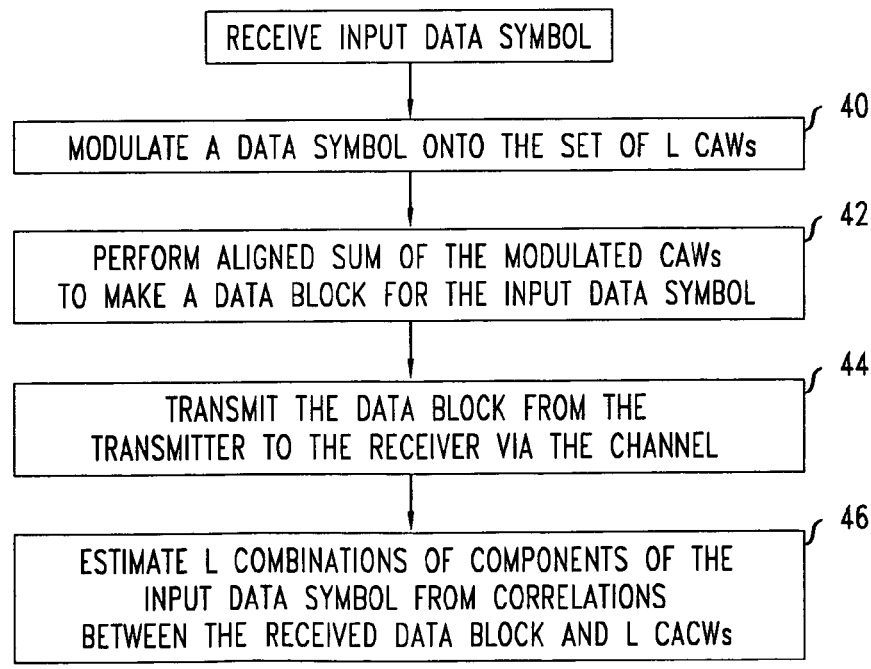

FIGS. 4a and 4b illustrate a method 30 of operating a communication system containing a transmitter, a receiver, and a point-to-point channel coupling the transmitter to the receiver, e.g., communication system 10 of FIG. 1. The method 30 includes performing a calibration phase to design and distribute channel-adaptive waveforms (CAWs) and channel-adaptive conjugate waveforms (CACWs) and performing a communication phase to communicate a sequence of data blocks over the communication channel using those CAWs and CACWs.

Referring to FIG. 4a, the calibration phase includes a sequence of steps that designs the set of CAWs and the corresponding set of CACWs and that distributes the designs of said waveforms.

In one embodiment, the steps of the calibration phase include transmitting a predetermined sequence of pilot signals over the communication channel between the transmitter and receiver (step 32). Both the transmitter and the receiver know the forms of the sequence of transmitted pilot signals. For example, these training sequences may be programmed into these devices at their manufacture, installation, or upgrade. The pilot signals are transmitted on the same communication channel that will be used to transport data blocks in the communication phase. The pilot signals may be transmitted along the forward channel from the transmitter to the receiver in the communication phase. In a duplex communication system, the pilot signals may alternately be transmitted along the reverse communication channel provided that the reverse and forward communications use the same physical channel and the same carrier frequency, e.g., as in time-division duplex communications.

The steps of the calibration phase include measuring the received pilot signals to evaluate the impulse response function of the communication channel (step 34). The evaluation of the channel's impulse response function involves comparing received forms of the pilot signals to the transmitted forms of the same pilot signal. The comparison determines the values of part or all of the impulse response function, i.e., $h_T$, for different values of the delay "T" as measured in numbers of sampling intervals. The comparison determines, at least, the values of $h_1, h_2 \ldots, h_{T_D}$, which define the part of the impulse response function relating to interference between sampling intervals of adjacent data blocks, i.e., $H_1$ as described below.

The comparison may also determine the value of $h_0$ of eq. (1), which is not related to such channel-induced inter-data block interference.

The steps of the calibration phase include designing a set of L linearly independent CAWs and a corresponding set of L linearly independent CACWs from the evaluated part of the impulse response (step 36). The CAWs and CACWs may be represented by respective $T_S \times L$ matrices $\Psi$ and $\Phi$:

$$\Psi = \begin{bmatrix} \psi_{11} & \psi_{12} & & \psi_{1L} \\ \psi_{21} & \psi_{22} & & \psi_{2L} \\ \vdots & \vdots & \cdots & \vdots \\ \psi_{T_S 1} & \psi_{T_S 2} & & \psi_{T_S L} \end{bmatrix} \quad (2)$$

and $$\Phi = \begin{bmatrix} \phi_{11} & \phi_{12} & & \phi_{1L} \\ \phi_{21} & \phi_{22} & & \phi_{2L} \\ \vdots & \vdots & \cdots & \vdots \\ \phi_{T_S 1} & \phi_{T_S 2} & & \phi_{T_S L} \end{bmatrix}.$$

Here, each column of $\Psi$ is an independent CAW, and each column of $\Phi$ is an independent CACW. The step of designing the CAWs, i.e., the matrix $\Psi$, and the corresponding CACWs, i.e., the matrix $\Phi$, is based, at least, on the matrix elements of the part of the impulse response function that relates to interference between the sampling intervals of adjacent data blocks, i.e., $H_1$ as shown below. Both the CAWs and the CACWs may be selected to form orthonormal bases of dimension L over the complex space of dimension $T_S$. The orthonormality conditions on the CAWs and the CACWs are then, described as follows:

$$\Psi^\dagger \cdot \Psi = I_{L \times L} \text{ and } \Phi^\dagger \cdot \Phi = I_{L \times L} \quad (3)$$

Here, $I_{L \times L}$ is the L×L unit matrix, and the superscript "†" denotes "conjugate transpose". While such orthogonality and/or normality conditions are not required, they may be advantageous for modulating data onto the CAWs and demodulating data form the CACWs as discussed below.

It is desirable that the transmitter has a design of the CAWs that is compatible with the design of the CACWs for the receiver. One method to ensure compatibility is to have only one of the transmitter and the receiver design both the CAWs and the CACWs. Thus, in some embodiments, only one of the transmitter and the receiver has an apparatus for performing the design of the CAWs and the CACWs as described in steps 32, 34, and 36. Then, the transmitter or receiver that designs the CAWs and CACWs sends data representative of the waveforms or conjugate waveforms to the receiver or transmitter, i.e., as appropriate, so that the non-designing device will have compatible waveforms.

In such embodiments, the steps of the calibration phase include appropriately distributing the designed sets of CAWs and CACWs between the transmitter and the receiver (step 38). In particular, the CAWs must be made available to the transmitter, and the CACWs must be made available to the receiver. For example, if the receiver does the measurements and calculations to determine the CAWs and CACWs from the measurements. The receiver would send the evaluated design of the CAWs to the transmitter using, e.g., a known digital communication technique.

If the communication channel is reciprocal such that the impulse response functions are the same in the forward and reverse directions, an alternate method may be useful to determine and distribute the matrices $\Psi$ and $\Phi$. In particular, the alternate method may avoid the need of an alternate way to communicate one of the matrix $\Psi$ and the matrix $\Phi$ between the transmitter and receiver while ensuring that the transmitter and receiver have compatible matrices $\Psi$ and $\Phi$.

The alternate method includes transmitting a sequence of pilot signals from the receiver to the transmitter via the reverse communication channel. Again, both the receiver and the transmitter know the form of the sequence of pilot signals. The alternate method includes having the transmitter evaluate the channel impulse response function by measuring the received sequence of pilot signals and comparing the measured pilot signals with the known form of the pilot signals. The alternate method includes computing designs for the set of CAWs and the set of CACWs in the transmitter based on the measured impulse response function. The alternate method includes transmitting from the transmitter to the receiver via the normal forward communication channel sufficient data for the receiver to recalculate the compatible set of CACWs, i.e., the matrix $\Phi$. This step of transmitting includes sending a sequence of data blocks from the transmitter to the receiver via the forward communication channel, wherein each data block has a length $T_S$. The sequence comprises, e.g., the first CAW, a data block with no transmit power, the second CAW, a data block with no transmit power, etc. That is, the sequence of transmitted data blocks is: $\psi_1, 0, \psi_2, 0, \ldots \psi_L, 0$. The impulse response of the communication channel will transform the transmitted data blocks during transmission so that the receiver receives the sequence of data blocks: $H_0 \cdot \psi_1$, $H_1 \cdot \psi_1, H_0 \cdot \psi_2, H_1 \cdot \psi_2, \ldots, H_0 \cdot \psi_L, H_1 \cdot \psi_L$ up to the additive noise. In the alternate method, the effects of noise may be reduced by techniques known to those of skill in the art, e.g., resending the sequence several times and averaging corresponding received data blocks. From the received sequence, the alternate method includes combining the received data blocks at the receiver to produce the matrices $H_0 \cdot \Psi$ and $H_1 \cdot \Psi$, i.e., up to noise. Next, the alternate method involves having the receiver evaluate the SVD of $H_1 \cdot \Psi$ to obtain the $\lfloor T_S - T_D / 2 \rfloor$ CACW column vectors of the matrix $\Phi'$, e.g., as described below in step 68 of method 60. Finally, the alternate method may also include evaluating, at the receiver, the SVD of $\Phi'^\dagger \cdot H_0 \cdot \Psi$ to obtain a unitary transformation of the matrix $\Phi'$ that diagonalizes $\Phi'^\dagger \cdot H_0 \cdot \Psi$ by the method 80 of FIG. 7. The alternate method may be able to provide a form for the CACW matrix $\Phi$ that is compatible with the matrix $\Psi$ already determined in the transmitter.

In some embodiments, the calibration phase is performed sufficiently often, e.g., by the transmitter and/or receiver, to ensure that the forms of the set of CAWs and the set of corresponding CACWs dynamically track the impulse response function of the communication channel. Such tracking may allow the CAWs and CACWs to maintain desirable properties as described below in a manner responsive to a changing impulse response function or changing portions thereof, e.g., $H_1$.

Referring to FIG. 4b, the communication phase includes performing a sequence of steps responsive to the receipt of each input data symbol by the transmitter.

For each received input data symbol, the steps of the communication phase include performing modulations of the components of received input data symbol onto amplitudes of the corresponding CAWs of the set designed in the calibration phase (step 40). The input data symbols are L-dimension vectors, e.g., the q-th input data symbol $a_q$ is given by $[a_{1q}, a_{2q}, \ldots, a_{Lq}]^T$ where the superscript "$T$" denotes "unconjugated transpose". The modulation of each component of an input data symbol onto a corresponding CAW is performed in parallel with the modulation of the other components of the same input data symbol onto other CAWs. For example, each modulator 14 of the parallel array in FIG. 1 modulates a corresponding component of the input data symbol onto a preselected one of the CAWs in parallel with the other modulators 14. For example, in response to the q-th input data symbol, the k-th modulator 14 of FIG. 1 will produce a temporal sequence of output signals represented by the column vector $a_{kq} \cdot [\psi_{1k}, \psi_{2k}, \ldots, \psi_{T_S k}]^T$. Each of the output signals represents the form of the modulated k-th CAW for one of the $T_S$ sampling intervals for one data block.

For each input data symbol, the steps of the communication phase include summing the L modulated CAWs produced at step 40 in a temporally aligned manner (step 42). The step of summing forms a weighted linear superposition of the CAWs, i.e., one data block for transmission. In the linear superposition, the starting sampling intervals of the individual modulated CAWs are temporally aligned. For example, the adder 15 of FIG. 1 performs such steps of summing the parallel-modulated CAWs that were produced by the modulators 14. In response to the input data symbol $a_q$, the combination of the modulating and summing steps 40, 42 produces an output data block that may be represented by a $T_S$-dimension column vector $s_q$. The column vector $s_q$ may be written as:

$$s_q = a_{1q} \cdot \begin{bmatrix} \psi_{11} \\ \psi_{21} \\ \vdots \\ \psi_{T_S 1} \end{bmatrix} + a_{2q} \cdot \begin{bmatrix} \psi_{12} \\ \psi_{22} \\ \vdots \\ \psi_{T_S 2} \end{bmatrix} + \ldots + a_{Lq} \cdot \begin{bmatrix} \psi_{1L} \\ \psi_{2L} \\ \vdots \\ \psi_{T_S L} \end{bmatrix} = \Psi \cdot a_q. \quad (4)$$

In eq. (4), each term of the sum represents the synchronized output of a corresponding one of the modulators 14 of FIG. 1. The last form of eq. (4) writes the output data block $s_q$ in terms of a $T_S \times L$ complex matrix representation, $\Psi$, of the set of CAWs of eqs. (2) and (3).

For each input data symbol, the steps of the communication phase include transmitting the data block, which are produced at the step 42, over the communication channel that couples the transmitter to the receiver, e.g., communication channel 13 of FIG. 1 (step 44). The communication channel distorts the data blocks due to its impulse response function and additive noise. In the various embodiments, the data blocks are designed to be, at least, as long as the delay-spread of the channel, i.e., $T_S \geq T_D$. For that reason, ISI only distorts immediately adjacent transmitted data blocks. Thus, eq. (1) simplifies when written in data block form so that the q-th transmitted data block, $s_q$, and the q-th received data block, $x_q$, are related as follows:

$$x_q = H_0 \cdot s_q + H_1 \cdot s_{q-1} + W_q \quad (5a)$$

$$x_q = H_0 \cdot \Psi \cdot a_q + H_1 \cdot \Psi \cdot a_{q-1} + W_q \quad (5b)$$

That is, the received data block $x_q$ only depends on two adjacent transmitted data blocks $s_q$ and $s_{q-1}$, i.e., interference only occurs between immediately adjacent data blocks. The L×L complex matrices $H_0$ and $H_1$ are formed from the impulse response function of the communication channel and are given by:

$$H_0 = \begin{bmatrix} h_0 & 0 & \cdots & & & & 0 \\ h_1 & h_0 & 0 & \cdots & & & \\ \vdots & & \ddots & \ddots & \ddots & & \\ h_{T_D} & \cdots & h_1 & h_0 & 0 & \cdots & 0 \\ 0 & h_{T_D} & & h_1 & h_0 & \ddots & \vdots \\ & & \ddots & & \ddots & \ddots & 0 \\ 0 & \cdots & 0 & h_{T_D} & \cdots & h_1 & h_0 \end{bmatrix} \quad (6)$$

and $$H_1 = \begin{bmatrix} 0 & \cdots & 0 & h_{T_D} & \cdots & h_2 & h_1 \\ 0 & \cdots & & 0 & h_{T_D} & \ddots & h_2 \\ & & & & & \ddots & \\ 0 & \cdots & & & 0 & & h_{T_D} \\ 0 & \cdots & & & & & 0 \\ & & & \vdots & & & \\ 0 & \cdots & & & & & 0 \end{bmatrix}.$$

The rank of matrix $H_1$, which produces any inter-data block interference, is equal to the channel's delay-spread. In eq. (5), the column vector $w_q$ for the additive noise is given by $w_q = [w_{1q}, w_{2q}, \ldots, w_{T_S q}]^T$.

For each input data symbol, the steps of the communication phase include estimating L linearly independent combinations of the components of the input data symbol carried by the received data block (step 46). The estimating involves measuring correlations between the received data block and the CACWs, which were designed during the calibration phase. The measurement of each correlation involves evaluating an inner product between a received data block and each of the CACWs. Each inner product involves sampling the product of ones of the CACW$^\dagger$s with the received data block over a sequence of $T_S$ consecutive sampling intervals and summing the sampled values. Again, the sequence of sampling intervals is time-aligned to start at the first sampling interval of the received data block. In particular, the evaluating step produces an L-dimensional estimate vector, $y_q$, for each input data symbol, $a_q$, wherein the $y_q$ is given by:

$$y_q = \Phi^\dagger \cdot x_q = \Phi^\dagger \cdot H_0 \cdot \Psi \cdot a_q + \Phi^\dagger \cdot H_1 \cdot \Psi \cdot a_{q-1} + \Phi^\dagger \cdot w_q. \quad (7a)$$

Here, the last equation results from eq. (5b) for the channel transformation of the transmitted data block.

Above eq. (7a) would be valid for a variety of sets of waveforms, $\Psi$, and conjugate waveforms, $\Phi$, provided that the lengths of the data blocks satisfy $T_S \geq T_D$. When $\Psi$ is a matrix whose columns are the CAWs, and $\Phi$ is a matrix whose columns are the CACWs, the inter-block interference term of eq. (7a) vanishes, i.e., $\Phi^\dagger \cdot H_1 \cdot \Psi = 0$. Thus, above step 46 can use the following equation to obtain estimates of the linear combinations of the components of the input data symbols.

$$y_q = \Phi^\dagger \cdot H_0 \cdot \Psi \cdot a_q + \Phi^\dagger \cdot w_q. \quad (7b)$$

Some embodiments of the CAWs and CACWs also further diagonalize the matrix $\Phi^\dagger \cdot H_0 \cdot \Psi$. In those embodiments, there is substantially no mixing between the L components of the input data symbols. That is, the physical transmission channel is effectively diagonalized into L sub-channels, wherein each sub-channel corresponds to one CAW and one CACW. Then, above step 46 can use the following equation to obtain estimates of the values of the input data symbols.

$$y_{kq} = g_k \cdot a_{kq} + [\Phi^\dagger \cdot w_q]_k. \quad (7c)$$

Here, the "$g_k$"s are the diagonal elements of the matrix $\Phi^\dagger \cdot H_0 \cdot \Psi$. In these special embodiments, the "$g_k$"s are effectively the gains associated with sub-channels of the physical communication channel, i.e., sub-channels corresponding to the L individual components of the input data symbols.

Several methods are available to design the CAWs and CACWs from the impulse response function of the communication channel, e.g., as evaluated at step 34 of FIG. 4a.

Figure 5:
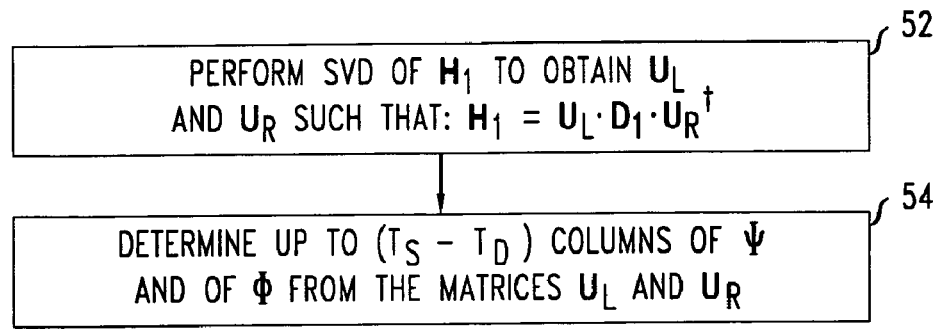
FIG. 5 is a flow chart illustrating a method for designing channel-adaptive waveforms (CAWs) and channel-adaptive conjugate waveforms (CACWs), wherein the method and/or waveforms may be used in methods of FIGS. 3a, 3b, 4a and/or 4b.

FIG. 5 illustrates an exemplary method 50 for designing the CAWs and CACWs in a manner that ensures that the associated matrices $\Psi$ and $\Phi$ satisfy $\Phi^\dagger \cdot H_1 \cdot \Psi = 0$. Thus, the CAWs of method 50 can be used to design/produce data blocks that can be transmitted over the communication channel effectively without introducing inter-block interference. The design of the CAWs and CACWs requires a measurement, at least, of the non-zero $H_1$ matrix elements of the channel's impulse response. The $H_1$ part of the channel's impulse response function relates to inter-data block interference, i.e., interference between the sampling intervals of adjacent data blocks.

The method 50 includes performing a singular value decomposition (SVD) of the $T_S \times T_S$ complex matrix $H_1$ (step 52). In particular, the singular value decomposition (SVD) determines the complex square matrices $U_L$ and $U_R$ such that:

$$H_1 = U_L \cdot D_1 \cdot U_R^\dagger \quad (8a)$$

where $D_1$ is diagonal and $$U_L^\dagger \cdot U_L = U_R \cdot U_R^\dagger = I_{Ts \times Ts}. \quad (8b)$$

Here, $I_{Ts \times Ts}$ is the $T_s \times T_s$ identity matrix. The SVD produces a matrix D whose diagonal elements are real, are nonnegative, and are non-increasing with row and column number. Numerical methods for performing SVDs of general complex matrices are well known to those of skill in the art.

The method 50 includes assigning the last $(T_S - T_D)$ columns of $U_R$ to be $(T_S - T_D)$ columns of $\Psi$ and assigning any orthonormal set of vectors of dimension $T_S$ to be the $(T_S - T_D)$ corresponding columns of $\Phi$ (step 54). Such an assignment produces a pair of $\Psi$ and $\Phi$ matrices with $(T_S - T_D)$ columns and $T_S$ rows each, i.e., $L = (T_S - T_D)$. Since $H_0$ is invertible, the above assignment of columns of $U_R$ as columns of $\Psi$ ensures that inter-data block ISI will vanish, i.e., $\Phi^\dagger \cdot H_1 \cdot \Psi = 0$ and that $\Phi^\dagger \cdot H_0 \cdot \Psi$ is invertible.

The above selection for $\Psi$ may be understood from eqs. (6), (8a), and (8b). Eq. (6) shows that $H_1$ has a dimension of $T_S$ and rank $T_D$, i.e., a rank equal to the channel's delay-spread. Thus, in the SVD of $H_1$, the diagonal matrix $D_1$ has $T_D$ non-vanishing diagonal elements and $(T_S - T_D)$ vanishing diagonal elements. Due to the ordering of diagonal elements in $D_1$, the vanishing diagonal elements are located in its last $(T_S - T_D)$ columns and rows. For that reason, the last $(T_S - T_D)$ columns of $U_L \cdot D_1$ vanish. Then, the relation that $H_1 \cdot U_R = U_L \cdot D_1$ and eqs. (8a) and (8b) imply that the last $(T_S - T_D)$ columns $H_1 \cdot U_R$ also vanish. Thus, assigning the last $(T_S - T_D)$ columns of $U_R$ to be columns of $\Psi$ produces a subspace $\Psi_{null}$ for which $H_1 \cdot \Psi_{null} = 0$. For that reason, the above-described form for the CAW matrix $\Psi$ ensures the effective absence of inter-block interference for any choice of the CACW matrix $\Phi$. The last $(T_S - T_D)$ columns of $U_R$ will be referred to as $U_{R\ null}$.

In an alternate embodiment, step 54 of method 50 is replaced by a step where the last $(T_S - T_D)$ columns of $U_L$ are assigned to be columns of $\Phi$ and any $(T_S - T_D)$, $T_S$-dimensional, independent vectors are assigned to be the columns of $\Psi$. This alternate assignment scheme also ensures that inter-data block interference effectively vanishes, i.e., $\Phi^\dagger \cdot H_1 \cdot \Psi = 0$. In particular, the last $(T_S - T_D)$ rows of $D_1 \cdot U_R^\dagger$ vanish, which implies that the last $(T_S - T_D)$ rows of $U_L^\dagger \cdot H_1$ vanish. Thus, assigning the last $(T_S - T_D)$ columns of $U_L$ to be columns of $\Phi$ produces a subspace $\Phi_{null}$ for which $\Phi_{null}^\dagger \cdot H_1 = 0$.

While method 50 and the alternate embodiment thereto produce up to $(T_S - T_d)$ independent CAWs and a corresponding $(T_S - T_d)$ independent CACWs that together satisfy $\Phi^\dagger \cdot H_1 \cdot \Psi = 0$, there are generally larger sets of CAWs and the corresponding CACWs that satisfy the constraint $\Phi^\dagger \cdot H_1 \cdot \Psi = 0$ and the orthonormality conditions of eq. (3). In particular, it is possible to find $\lfloor T_S - T_D/2 \rfloor$ linearly independent CAWs and a corresponding $\lfloor T_S - T_D/2 \rfloor$ linearly independent CACWs that together satisfy $\Phi^\dagger \cdot H_1 \cdot \Psi = 0$ and the orthonormality conditions of eq. (3). Thus, $\lfloor T_D/2 \rfloor$ additional CAWs and additional CACWs can be added without producing inter-data block ISI. Indeed, these results imply that the number of linearly independent CAWs is greater than $(T_S - T_d)$ in some embodiments of the present invention. Herein, $\lfloor c \rfloor$ denotes the largest integer less than or equal to c, and $\lceil c \rceil$ denotes the smallest integer greater than or equal to c.

Figure 6:
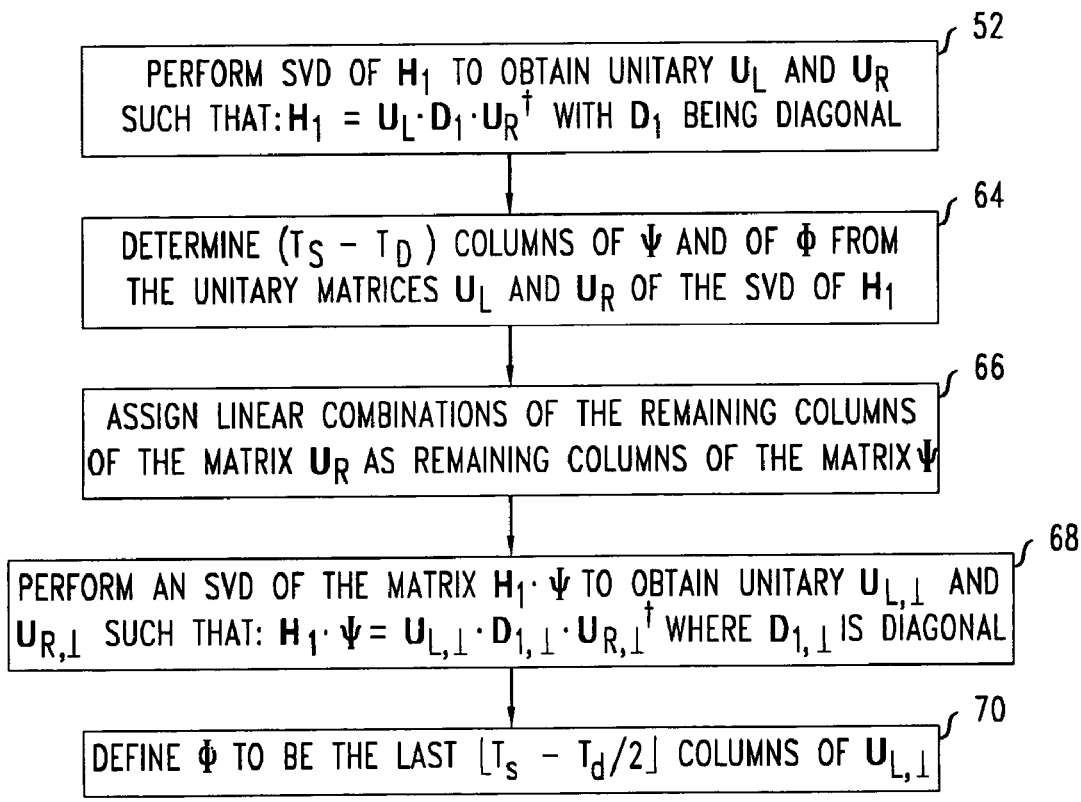
FIG. 6 is a flow chart illustrating an alternate method of designing CAWs and CACWs, wherein the method and/or waveforms may be used in methods of FIGS. 3a, 3b, 4a and/or 4b.

Some alternate embodiments of methods for designing matrices $\Psi$ and $\Phi$ can maintain the conditions $\Phi^\dagger \cdot H_1 \cdot \Psi = 0$, while explicitly determining some or all of the $\lfloor T_D/2 \rfloor$ additional CAWs and $\lfloor T_D/2 \rfloor$ additional CACWs. One such embodiment is method 60, which is illustrated in FIG. 6.

The method 60 includes performing a singular value decomposition (SVD) of the complex matrix $H_1$ as already described for the method 50 of FIG. 5 (step 52).

The method 60 includes determining $(T_S - T_D)$ columns of the CAW matrix $\Psi$ from the unitary matrix $U_R$ of the SVD for $H_1$, i.e., as described for the method 50 of FIG. 5 (step 64). In particular, the determining step 64 assigns the last $(T_S - T_D)$ columns of $U_R$, i.e., $U_{R\ null}$, to be $(T_S - T_D)$ columns of the CAW matrix $\Psi$. The remaining columns of $U_R$ will be referred to as the matrix $U_{R\ null\ \perp}$ to indicate their orthogonality to $U_{R\ null}$.

The method 60 includes assigning up to $\lfloor T_D/2 \rfloor$ independent orthogonal linear combinations from the remaining columns of the matrix $U_R$ to be columns of the CAW matrix $\Psi$ (step 66). In particular, the up to $\lfloor T_D/2 \rfloor$ independent combinations may be written as $U_{R\ null\perp} \cdot \Theta$. For the maximum dimension case, $\Theta$ is a $T_D \times \lfloor T_D/2 \rfloor$ parameter matrix satisfying the unitarity condition $\Theta^\dagger \cdot \Theta = I_{\lfloor T_D/2 \rfloor \times \lfloor T_D/2 \rfloor}$. Thus, the method 60 defines the CAW matrix $\Psi$ by:

$$\Psi = [U_{R\ null\ \perp} \cdot \Theta U_{R\ null}]. \quad (9)$$

In the method 60, the parameter matrix $\Theta$ is otherwise unconstrained.

The method 60 includes performing a SVD of the matrix $H_1 \cdot \Psi$, wherein the matrix $H_1 \cdot \Psi$ was obtained at step 66 (step 68). This SVD obtains matrices $U_{L,\perp}$ and $U_{r,\perp}$ that enable writing $H_1 \cdot \Psi$ as:

$$H_1 \cdot \Psi = U_{L,\perp} \cdot D_{1,\perp} \cdot U_{R,\perp}^\dagger \quad (10a)$$

where $D_{1,\perp}$ is diagonal, and $$U_{L,\perp}^\dagger \cdot U_{L,\perp} = I_{Ts \times Ts}, \text{ and } U_{R,\perp}^\dagger \cdot U_{R,\perp} = I_{Ts \times Ts}. \quad (10b)$$

The SVD ensures that the diagonal elements of $D_{1,\perp}$ are nonnegative, real and non-increasing with row and column indices.

The method 60 also includes defining the columns of the matrix $\Phi$ to be as many as the last $\lfloor T_S - T_D/2 \rfloor$ columns of $U_{L,\perp}$ (step 70). In particular, one defines $\Phi$ to have the same number of columns as $\Psi$. In the largest dimension case, due to the ordering of the diagonal elements of $D_{1,\perp}$ and the fact that there are $\lfloor T_S - T_D/2 \rfloor$ conjugate waveforms for which $\Phi^\dagger \cdot H_1 \cdot \Psi = 0$ is satisfied, the last $\lfloor T_S - T_D/2 \rfloor$ columns of $U_{L,\perp}$ will provide a representation of the CACW matrix $\Phi$.

Methods 50 and 60 of FIGS. 5 and 6 constructed the CAW matrix $\Psi$ in the form $[U_{R\,null\,\perp} \Theta U_{R\,null}]$ and then, performed a SVD of $H_1 \cdot \Psi$ to obtain a unitary matrix $U_{L,\perp}$ with columns that provided the CACW matrix $\Phi$. From the above description, it will be obvious to one of the skill in the art that a similar construction could have reversed the roles of the CACW matrix $\Phi$ and the CAW matrix $\Psi$. In such a construction, the CACW matrix $\Phi$ is in the form $[U_{L\,null\,\perp} \Theta U_{L\,null}]$ where $U_{L\,null}$ is formed of the last $(T_S - T_D)$ columns of $U_L$. Then, a SVD of the matrix $\Phi^\dagger \cdot H_1$, i.e., $\Phi^\dagger \cdot H_1 = V_{L,\perp} \cdot D_{2,\perp} \cdot V_{R,\perp}^\dagger$, would yield a unitary matrix $V_{R,\perp}$ whose last $\lfloor T_S - T_D/2 \rfloor$ columns would provide the CAW matrix $\Psi$.

Figure 7:
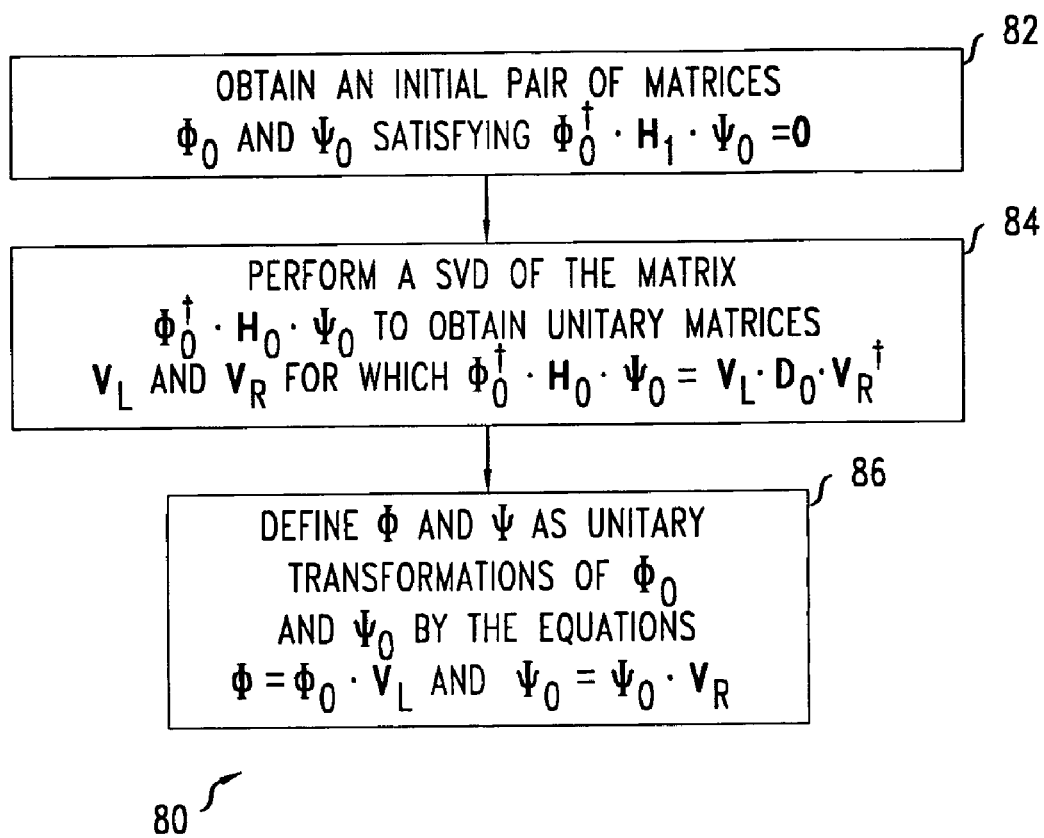

FIG. 7 illustrates a method 80 of obtaining a CAW matrix $\Psi$ and a CACW $\Phi$ such that $\Phi^\dagger \cdot H_1 \cdot \Psi = 0$, and $\Phi^\dagger \cdot H_0 \cdot \Psi$ is diagonal.

The method 80 includes performing method 50 or FIG. 5 or method 60 of FIG. 6 to obtain an initial pair of matrices $\Phi_0$ and $\Psi_0$ that satisfy the inter-data block ISI removal condition, i.e., $\Phi_0^\dagger \cdot H_1 \cdot \Psi_0 = 0$ (step 82).

Next, the method 80 includes performing a SVD of the matrix $\Phi_0^\dagger \cdot H_0 \cdot \Psi_0$ (step 84). The SVD produces $T_S \times T_S$ unitary matrices $V_L$ and $V_R$ for which $\Phi_0^\dagger \cdot H_0 \cdot \Psi_0$ satisfy:

$$\Phi_0^\dagger \cdot H_0 \cdot \Psi_0 = V_L \cdot D_0 \cdot V_R^\dagger, \quad (12a)$$

where $D_0$ is a diagonal matrix and $$V_L \cdot V_L^\dagger = I \text{ and } V_R \cdot V_R^\dagger = I. \quad (12b)$$

Then, the method 80 involves defining $\Phi$ and $\Psi$ as unitary transformations of $\Phi_0$ and $\Psi_0$ as follows:

$$\Phi = \Phi_0 \cdot V_L \text{ and } \Psi = \Psi_0 \cdot V_R \quad \text{(step 86)}.$$

By eqs. (12a) and (12b), these definitions imply that $\Phi^\dagger \cdot H_0 \cdot \Psi = D_0$ and also that $\Phi^\dagger \cdot H_1 \cdot \Psi = 0$. Also, $\Psi$ and $\Phi$ remain unitary as in eq. (3). Thus, the method 80 diagonalizes $\Phi^\dagger \cdot H_0 \cdot \Psi$ without introducing ISI, i.e., $\Phi^\dagger \cdot H_1 \cdot \Psi$ still vanishes. In particular, eq. (7) becomes:

$$y_{kq} = d_k \cdot a_{kq} + [\Phi^\dagger \cdot w_q]_k \quad (13)$$

Here, the $d_k$ is the k-th diagonal element of $D_0$. By eq. (13), the CAWs and CACWs of method 80 split the communication channel into a set of independent sub-channels that are also free of inter-data block ISI.

Other embodiments provide additional methods for improving sets of CAWs and CACWs that were designed by method 50, method 60, and/or method 80 of FIGS. 5-7. Some such additional methods design a new CAW matrix $\Psi'$ and new CACW matrix $\Phi'$ that together produce lower total transmission powers or higher information capacities in the communication channel.

For example, the matrices $\Psi'$ and $\Phi'$ may be selected to optimize a cost function on these matrices. In one embodiment, the cost function is the total channel energy, E, which is given by:

$$E = \text{Trace}[(\Phi^\dagger \cdot H_0 \cdot \Psi)^\dagger \cdot (\Phi^\dagger \cdot H_0 \cdot \Psi)]. \quad (14)$$

In another embodiment, the cost function, C, is indicative of the information capacity for a channel whose additive noise is independent from sample to sample and has a zero mean complex Gaussian distribution with constant variance. In bits per sample, the cost function C is given by:

$$C = \log_2[\text{determinant}[I_L + (\rho T_s/L)(\Phi^\dagger \cdot H_0 \cdot \Psi)^\dagger \cdot (\Phi^\dagger \cdot H_0 \cdot \Psi)]]/T_s \quad (15a)$$

$$= (1/T_s) \sum_{m=1}^{L} (\log_2[1 + (\rho T_s/L)(d_m)^2]).$$

Here, $\rho$ is the signal-to-noise ratio for the received signals, and the $d_m$'s are the singular values from the diagonal matrix in the SVD of $\Phi^\dagger \cdot H_0 \cdot \Psi$. In another embodiment, the powers of individual sub-channels are themselves optimized, which may further improve the capacity of the channel. Such an optimization may lead to a capacity of:

$$C = (1/T_s) \Sigma_{m=1}^{L} (\log_2[1 + (\rho T_s P_m)(d_m)^2]) \quad (15b)$$

where the $P_m$s are the powers assigned to each sub-channel and $\Sigma_{m=1}^{L} P_m = 1$. In the embodiments that optimize a function of $\Psi$ and $\Phi$, the method 50, the method 60, and/or the method 80 may provide the initial $\Psi$ and initial $\Phi$ that will be varied to optimize the cost function.

The above-described optimization functions are also nonlinear in $\Psi$ and $\Phi$. The optimization of such nonlinear functions can be performed in one of a variety of iterative manners.

Figure 8:
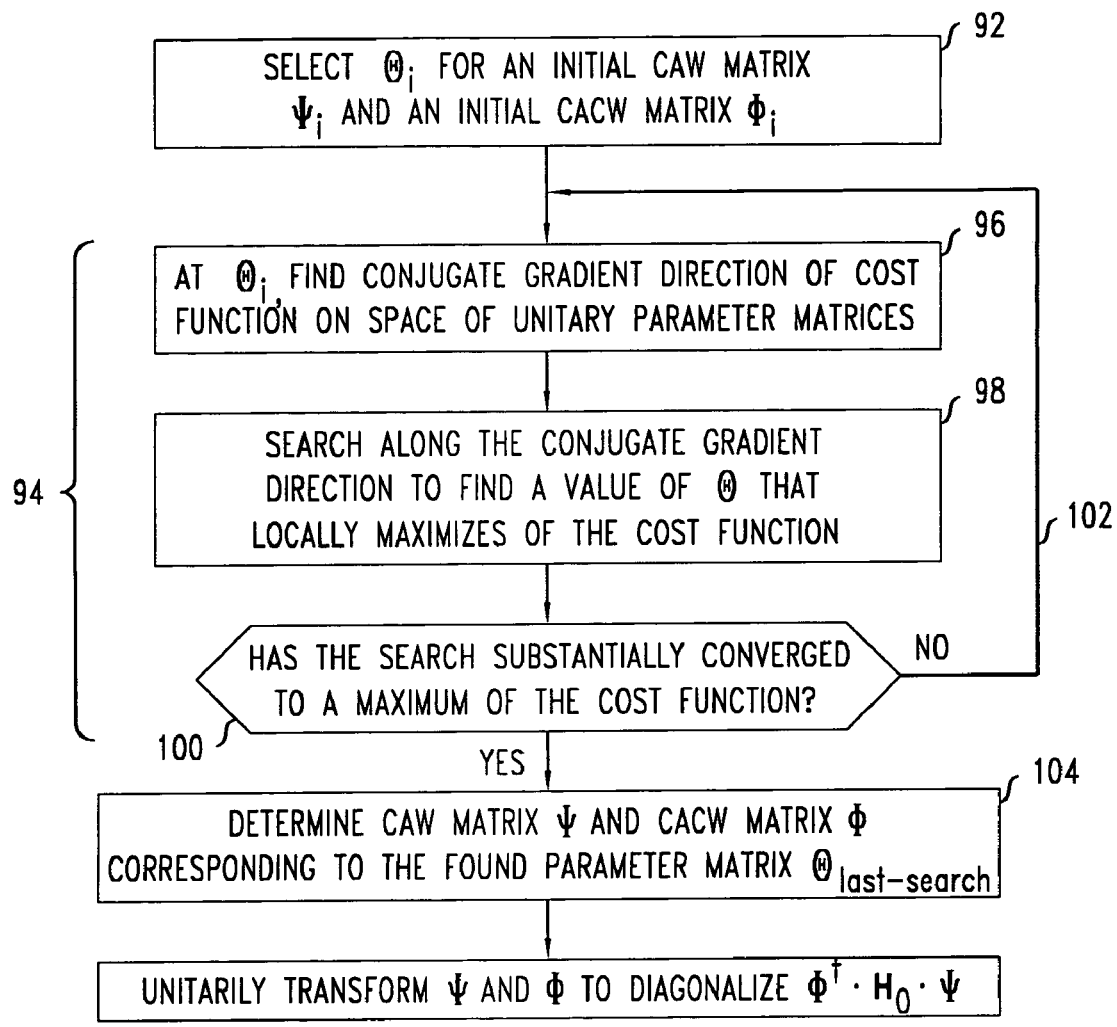
FIG. 8 is a flow chart illustrating an iterative method that redesigns CAWs and CACWs designed by the method of FIG. 6 in a manner that increases a cost function.

FIG. 8 illustrates a method 90 for redesigning an initial CAW matrix $\Psi_i$ and CACW matrix $\Phi_i$ to optimize a selected cost function, e.g., the cost function of eq. (14), eq. (15a), or eq. (15b). In the method 90, the matrices $\Psi$ and $\Phi$ are determined by the method 60 of FIG. 6. Thus, the matrix $\Psi$, the matrix $\Phi$, and the selected cost function depend on the parameter matrix $\Theta$ of eq. (9). Indeed, $\Psi$ and $\Phi$ can be written as functions of the parameter matrix $\Theta$ by a straightforward process that would be obvious to one of skill in the art in light of the above-disclosure.

The method 90 involves performing an iterative procedure to evolve the unitary parameter matrix $\Theta$ in a manner that tends to maximize the selected cost function, i.e., subject to the constraint $\Theta^\dagger \cdot \Theta = I$. In particular, the procedure includes selecting an initial unitary parameter matrix $\Theta_i$, i.e., the matrix that defines $\Psi_i$ and $\Phi_i$ (step 92). Then, the procedure includes performing a loop sequence (94) to achieve substantial convergence to a maximum of the selected cost function, i.e., at least two loops. The loop sequence includes finding the conjugate gradient direction of the selected cost function on the space of unitary parameter matrices at the point $\Theta_i$ (step 96). The loop sequence includes searching along the conjugate gradient direction to find a new unitary parameter matrix $\Theta$ that produces a local maximum value of the selected cost function in the space of parameter matrices (step 98). The method 90 includes determining whether the procedure has achieved substantial convergence to a maximum of the selected cost function (step 100). For example, step 100 may involve determining whether the difference between maximum value of the cost function in the present loop and the maximum value of the cost function in the previous loop has a magnitude that is smaller than a preselected threshold value. If the procedure has not achieved substantial convergence, the loop sequence is repeated (102) by taking the parameter matrix $\Theta_{last-search}$ that produced the maximum value of the cost function at step 98 to be the new initial parameter matrix. If the procedure has achieved substantial convergence, the procedure includes determining the matrices $\Psi$ and $\Phi$ that correspond to the matrix $\Theta_{last-search}$ that produced the maximum value of the cost function at step 98 (step 104). For example, eq. (9) and steps 966, 68 and 70 of method 60 can be used to determine the matrices $\Psi$ and $\Phi$. After performing the method 90, method 80 of FIG. 7 may optionally be performed to transform the determined matrices $\Psi$ and $\Phi$ in a manner that diagonalizes $\Phi^\dagger \cdot H_0 \cdot \Psi$.

While the invention may be susceptible to various modifications and alternative forms, specific embodiments have been shown by way of example in the drawings and have been described in detail herein. Nevertheless, the invention is not intended to be limited to the particular examples disclosed. Rather, the invention is to cover all modifications, equivalents, and alternatives falling within the spirit and scope of the invention as defined by the following appended claims.

What is claimed is:

1. A method for transmitting a sequence of data blocks of equal length, comprising:
   obtaining part of a matrix for an impulse response function of a communication channel between a transmitter and a receiver, the part relating to channel-induced interference between sampling intervals of adjacent ones of the data blocks;
   designing a set of one or more linearly independent waveforms based on the obtained part of the matrix for the impulse response function; and
   transmitting a sequence of the data blocks over the channel from the transmitter to the receiver, each data block of the sequence being a weighted linear superposition of the one or more waveforms of the designed set.

2. The method of claim 1, wherein the designed set has L of the waveforms and is such that between the L waveforms and L linearly independent conjugate waveforms of a second set matrix elements of the part of the matrix vanish.

3. The method of claim 2, wherein the designed waveforms are such that inner-products between the conjugate waveforms with the data blocks of the sequence after receipt at the receiver produce estimates for L linear independent combinations of weights; and
   wherein the weights define the weighted linear superposition and the estimates are free of interference between sampling intervals of different data blocks.

4. The method of claim 1, further comprising:
   transmitting a set of pilot signals over the communication channel that is between the transmitter and the receiver, the part of the matrix for the impulse response function being determined responsive to measurements of said pilot signals.

5. The method of claim 1, further comprising:
   for each one of the data blocks of the sequence, modulating the waveforms of the designed set to have amplitudes responsive of a received input data symbol and linearly superimposing the modulated waveforms to produce the each one of the data blocks.

6. The method of claim 5, wherein the designed set has a number L of the waveforms and the number L is greater than the number of the sampling intervals in the step of modulating minus a delay-spread of the communication channel, the delay-spread being expressed as a number of the sampling intervals.

7. A method for receiving at a receiver data transmitted from a transmitter via a communication channel having a delay-spread, comprising:
   receiving a sequence of transmitted data blocks at the receiver from the communication channel at a receiver, each transmitted data block having same temporal length and being transmitted to the channel from the transmitter;
   for each of the received data blocks, evaluating an inner product between the received data block and one or more linearly independent conjugate waveforms by sampling a product of the conjugate waveform times the received data block at a series of sampling intervals of equal sampling length; and
   wherein the evaluating is performed over a number of the conjugate waveforms that is greater than the number of the sampling intervals minus the delay-spread, the delay-spread being expressed as a number of the sampling intervals.

8. The method of claim 7, wherein the data blocks are weighted linear superpositions of transmission waveforms and the conjugate waveforms are such that the inner products produce estimates of linear combinations of weights, the weights defining weightings of corresponding ones of the transmission waveforms in the linear superpositions.

9. The method of claim 8, wherein the conjugate waveforms are configured such that the estimates are substantially free of interference between sampling intervals of adjacent ones of the data blocks.

10. The method of claim 8, wherein the conjugate waveforms are configured such that each inner product is sensitive to the weight of the corresponding one of the transmission waveforms and is insensitive to any other of the weights.

11. The method of claim 7, further comprising:
    designing said conjugate waveforms from a part of a matrix for the impulse response function of a communication channel between the transmitter and the receiver, the part relating to channel-induced interference between sampling intervals of adjacent ones of the data blocks.

12. An apparatus for communicating data, comprising:
    a transmitter comprising:
    an array of modulators, each modulator being configured to modulate an amplitude of a corresponding one of linear independent waveforms over a sequence of sampling intervals in response to receipt of each of a sequence of input data symbols; and
    an adder being configured to form a sequence of data blocks, each data block being a linear superposition of modulated transmitter waveforms produced by the modulators responsive to receipt of one of the input data symbols, the adder being configured to transmit the data blocks to a receiver via a communication channel; and
    wherein the transmitter is configured to dynamically adapt the modulated transmitter waveforms in a manner responsive to a part of the impulse response function of the communication channel relaxing to channel-induced interference between sampling intervals of adjacent data blocks.

13. The apparatus of claim 12, wherein the modulators are configured such that a matrix element of the part of the matrix between each of the modulated transmitter waveforms and each of corresponding conjugate waveforms vanishes.

14. The apparatus of claim 12, further comprising:
    a receiver, the receiver having an array of demodulators, each demodulator being configured to evaluate an inner product between a corresponding conjugate waveform and each of the transmitted data block received at the receiver via the channel; and
    wherein the modulated transmitter waveforms and corresponding conjugate waveforms are such that matrix elements of the part of the impulse response function between said modulated transmitter waveforms and corresponding conjugate waveforms vanish.

15. The apparatus of claim 12, wherein the number of the modulators is greater than the number of the sampling intervals minus a delay-spread of the channel, delay-spread being expressed as a number of the sampling intervals.

16. The apparatus of claim 14, wherein the number of the demodulators is greater than the number of sampling intervals minus the delay-spread of the channel, the delay-spread being expressed as a number of the sampling intervals.

* * * * *

UNITED STATES PATENT AND TRADEMARK OFFICE
CERTIFICATE OF CORRECTION

PATENT NO.      : 7,653,120 B2                          Page 1 of 1
APPLICATION NO. : 11/347589
DATED           : January 26, 2010
INVENTOR(S)     : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1028 days.

Signed and Sealed this

Twenty-eighth Day of December, 2010

David J. Kappos
*Director of the United States Patent and Trademark Office*